(12) United States Patent
Ye et al.

(10) Patent No.: US 11,063,670 B2
(45) Date of Patent: Jul. 13, 2021

(54) OPTICAL TRANSMITTER, METHOD AND STORAGE MEDIUM IN OPTICAL NETWORK

(71) Applicant: Nokia Solutions and Networks Oy, Espoo (FI)

(72) Inventors: Chenhui Ye, Shanghai (CN); Xiaofeng Hu, Shanghai (CN); Kaibin Zhang, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/709,994

(22) Filed: Dec. 11, 2019

(65) Prior Publication Data

US 2020/0195353 A1 Jun. 18, 2020

(30) Foreign Application Priority Data

Dec. 14, 2018 (CN) .......................... 201811532280.5

(51) Int. Cl.
*H04B 10/524* (2013.01)
*H04B 10/25* (2013.01)
*H04B 10/66* (2013.01)

(52) U.S. Cl.
CPC ........... *H04B 10/524* (2013.01); *H04B 10/25* (2013.01); *H04B 10/66* (2013.01)

(58) Field of Classification Search
CPC .................................................. H04B 10/524
See application file for complete search history.

(56) References Cited

U.S. PATENT DOCUMENTS

2012/0045209 A1*  2/2012  Boyd ................... H04B 10/524
                                                                        398/66
2017/0070296 A1*  3/2017  Okamoto ............. H04B 10/516
(Continued)

FOREIGN PATENT DOCUMENTS

CN          105959064 A        9/2016
CN          107592580 A        1/2018
(Continued)

OTHER PUBLICATIONS

Zhang Junwen et al. "EML-Based IM/DD 400G (4×112.5-Gbit/s) PAM-4 over 80 km SSMF Based on Linear Pre-Equalization and Nonlinear LUT Pre-Distortion for Inter-DCI Applications" 2017 Optical Fiber Communications Conference and Exhibition Mar. 19, 2017.

(Continued)

*Primary Examiner* — Nathan M Cors
(74) *Attorney, Agent, or Firm* — Harrington & Smith

(57) ABSTRACT

Embodiments are disclosed of methods performed at an optical transmitter, devices and computer-readable storage media. For example, the method includes performing a process to select a PAM value from a set of candidate PAM values based on currently transmitted training data bits, transmitted Pulse Amplitude Modulation (PAM) values corresponding to previously transmitted training data bits, and training data bits to be transmitted subsequently, the selected PAM value corresponding to the currently transmitted training data bits. The selected PAM value is transmitted to an optical receiver, and an indication as to whether the optical receiver correctly detects the currently transmitted training data bits is received from the optical receiver. Then, the process is updated at least in part based on the indication. The manner of performing neural network learning at an (Continued)

optical transmitter side to obtain an encoding strategy can maximize the channel allowable capacity.

17 Claims, 10 Drawing Sheets

(56) References Cited

U.S. PATENT DOCUMENTS

| | | | |
|---|---|---|---|
| 2017/0085324 A1* | 3/2017 | Rylyakov | H04B 10/5059 |
| 2018/0183521 A1 | 6/2018 | Zhang et al. | |
| 2020/0174185 A1* | 6/2020 | Barzegar | G02B 6/4286 |

FOREIGN PATENT DOCUMENTS

| | | |
|---|---|---|
| CN | 107749779 A | 3/2018 |
| EP | 3484169 A1 | 5/2019 |

OTHER PUBLICATIONS

Karanov Boris et al. "End-to-End Deep Learning of Optical Fiber Communications" Journal of Lightwave Technology, IEEE, USA vol. 36, No. 20, Oct. 15, 2018.

* cited by examiner

OPTICAL TRANSMITTER, METHOD AND STORAGE MEDIUM IN OPTICAL NETWORK

FIELD

Embodiments of the present disclosure generally relate to an optical network, and more specifically, to an optical transmitter, method and computer readable storage medium in an optical network.

BACKGROUND

Due to the use of optical fibers, FTTx (Fiber To The X, fiber access) is widely used as a new generation of bandwidth solution to provide users with a high-bandwidth, full-service access platform. FTTH (Fiber To the Home, which connects the optical fibers directly to users' home) is even referred to as the most ideal business transparent network, and is the ultimate way of access network development. In the optical fiber access network, after an optical transmitter encodes, modulates, and electro-optically converts a signal, the optical transmitter transmits the signal via an optical link to an optical receiver, and the optical receiver decodes, demodulates, and electro-optically converts the received signal to recover the originally transmitted signal.

Because the optical link has a non-Gaussian, nonlinear channel response, it generates inter-symbol interference on the signal, causing the signal recovered at the optical receiver side to be different from the originally transmitted signal. In this case, transmission errors occur, and the channel capacity utilization is reduced greatly. In order to deal with various impairments caused in the transmission link, intelligent and efficient equalization algorithms, such as post-equalization Maximum Likelihood Sequence Estimate (MLSE)/Viterbi for dual binary recovery, or the like, are usually used on the optical receiver side to backwards compensate for impairments to the signal. These algorithms are usually used on the optical receiver side and rarely used on the optical transmitter side. Existing preprocessing in an optical transmitter is either fixed or experience-based, with very limited flexibility. Due to the lack of an effective preprocessing method on signals at the optical transmitter side, the allowable capacity of the link cannot be fully utilized.

SUMMARY

Generally, embodiments of the present disclosure propose methods performed at an optical transmitter, devices, and computer readable storage media.

In a first aspect, embodiments of the present disclosure provide a method performed at an optical transmitter. In the method, a process is performed to select a PAM value from a set of candidate PAM values based on currently transmitted training data bits, transmitted Pulse Amplitude Modulation (PAM) values corresponding to previously transmitted training data bits, and training data bits to be transmitted subsequently, the selected PAM value corresponding to the currently transmitted training data bits. The selected PAM value is transmitted to an optical receiver and an indication as to whether the optical receiver correctly detects currently transmitted training data bits is received from the optical receiver. Then, the process is updated at least in part based on the indication.

In a second aspect, the embodiments of the present disclosure provide an optical transmitter. The optical transmitter comprises at least one processor and at least one memory storing computer program code. The at least one memory and computer program code are configured, together with the at least one processor, to cause the optical transmitter to: perform a process to select a PAM value from a set of candidate PAM values based on currently transmitted training data bits, transmitted Pulse Amplitude Modulation (PAM) values corresponding to previously transmitted training data bits, and training data bits to be transmitted subsequently, the selected PAM value corresponding to the currently transmitted training data bits; transmit the selected PAM value to an optical receiver; receive, from the optical receiver, an indication as to whether the optical receiver correctly detects the currently transmitted training data bits; and update the process at least in part based on the indication.

In a third aspect, the embodiments of the present disclosure provide a computer readable storage medium having computer program instructions stored thereon. The instructions, when executed by a processor on an optical transmitter, cause an optical transmitter to perform the method in the first aspect.

It would be appreciated that the content described in the Summary section is not intended to limit key or significant features of embodiments of the present disclosure, nor is it intended to be used to limit the scope of the present disclosure. Other features of the present disclosure will become readily understood from the following description.

BRIEF DESCRIPTION OF THE DRAWINGS

Several example embodiments will be described below with reference to the accompanying drawings, in which.

Throughout the drawings, the same or similar reference symbols refer to the same or similar elements.

DETAILED DESCRIPTION OF EMBODIMENTS

Figure 1:
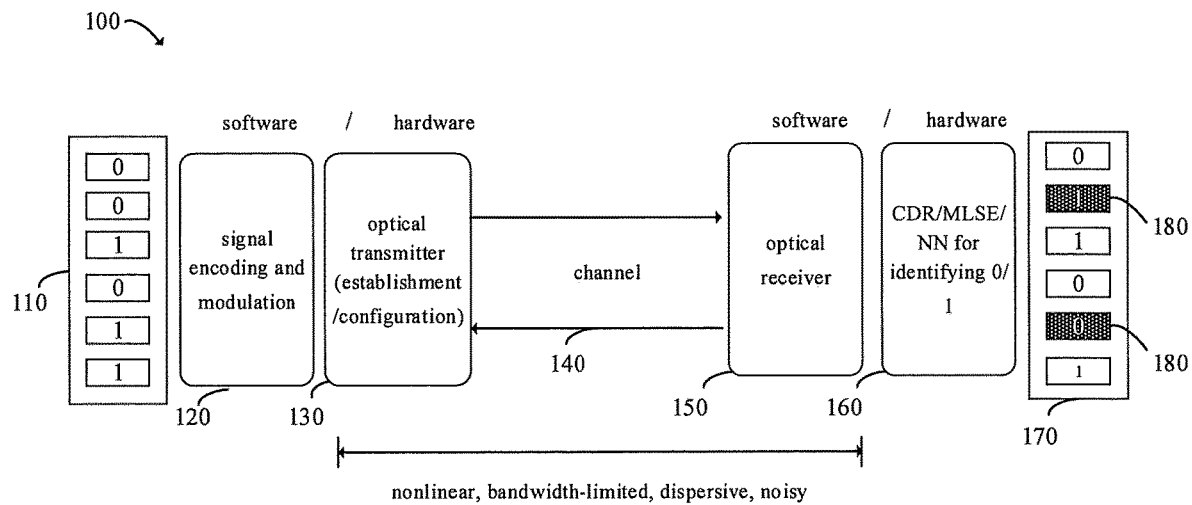
FIG. 1 illustrates an example architecture of functional modules in the existing optical network.

Embodiments of the present disclosure will now be described in detail with reference to the accompanying drawings. Although the drawings illustrate some embodiments of the present disclosure, it would be appreciated that the present disclosure may be implemented in various forms and should not be construed as limited to the embodiments set forth herein. Rather, these embodiments are provided to understand the present disclosure more thoroughly and completely. It should be understood that the drawings and embodiments of the present disclosure are for exemplary purposes only, and are not intended to limit the protection scope of the present disclosure.

The term "training process" or "learning process" as used herein refers to a process that utilizes experience or data to optimize system performance. For example, an optical transmitter can optimize an encoding strategy step by step through a training process or a learning process, such as encoding a transmitted sequence into a more noise-resistant encoding sequence. In the context of the present disclosure, the term "training" or "learning" can be used interchangeably for convenience of discussion.

The term "optical transmitter" as used herein refers to any appropriate device capable of transmitting information in an optical network. Examples of an optical transmitter include, but are not limited to, one or more of the following: an Optical Line Terminal (OLT), an Optical Network Unit (ONU), an Optical Network Terminal (ONT), an Optical Distribution Network (ODN), and the like.

The term "optical receiver" as used herein refers to any appropriate device capable of receiving information in an optical network. Examples of an optical receiver include, but are not limited to, one or more of the following: an Optical Line Terminal (OLT), an Optical Network Unit (ONU), an Optical Network Terminal (ONT), an Optical Distribution Network (ODN), and the like.

The term "circuit" as used herein refers to one or more of the following:

(a) a hardware circuit-only implementation (such as an analog and/or digital circuit-only implementation); and (b) a combination of hardware circuits and software, such as (if applicable): (i) a combination of analog and/or digital hardware circuits and software/firmware, and (ii) a combination of any portion of a hardware processor and software (including digital processors, software, and memories that work together to enable a device, such as OLT or other computing devices, to perform various functions); and (c) hardware circuits and/or a processor, such as a microprocessor or a part of a microprocessor, that requires that software (e.g. firmware) for operation, but may be absent when software is not required for operation.

The definition of circuit applies to all usage scenarios of this term in the present application (including any claim). For another example, the term "circuit" as used herein also covers implementations of only hardware or a processor (or processors), or a part of a hardware circuit or a processor, or its accompanying software or firmware. For example, if applicable to a particular claim element, the term "circuit" also covers a baseband integrated circuit, or a processor-integrated circuit, or a similar integrated circuit in the OLT or other computing devices.

The term "including" and its variants used herein are to be read as open-ended, that is, "including but not limited to." The term "based on" is to be read as "based at least in part on." The term "one embodiment" is to be read as "at least one embodiment;" and the term "another embodiment" is to be read as "at least one other embodiment." Related definitions of other terms will be given in the description below.

As described above, in a fiber access network, an optical transmitter transmits a signal to an optical receiver via an optical link. Because the optical link is a non-linear, bandwidth-limited, dispersive and noisy channel, it will cause interference to the transmission of the signal.

In order to detect and resolve such transmission errors, it is common to use an effective equalization and compensation algorithm on the optical receiver side. In previous work such as 25G-PON or 50G-PON, adaptive algorithms are implemented on the optical receiver side, for example, Least Mean Square (LMS) algorithm-based or Artificial Intelligence Neural Network (AI-NN)-based equalization and MLSE decoding, but none of the adaptive algorithms are performed on the optical transmitter side. In contrast, for the interference introduced by the link, the optical transmitter side does not have a clear guiding strategy when setting up its parameters (e.g., modulation, encoding, bias, drive circuit, modulation depth, and the like). In other words, all preprocessing implemented on the optical transmitter side is based on experience, for example, pre-emphasis or dual binary encoders.

Therefore, it is important to require an optical transmitter to perform a training process that automatically adjusts its configuration step by step to maximize channel capacity utilization.

FIG. 1 illustrates an example architecture of functional modules in an existing optical network 100. The network 100 is generally composed of software and hardware functional blocks, including: an encoding and modulating unit 120, an optical transmitter 130, a channel 140, an optical receiver 150, and CDR/MISE/NN 160 for identifying 0/1. Because the channel 140 causes interference to the transmission of the signal, the received sequence recovered at the optical receiver 150 side will be different from the original sequence transmitted at the optical transmitter 130. For example, in FIG. 1, a sequence 110 transmitted on the optical transmitter side is "001011", and the received sequence 170 decoded and recovered on the optical receiver side is "011001." It can be seen that the transmission errors of the "0" of the second bit and the "1" of the fifth bit in the transmitted sequence 110 occur, and are recovered to the bits 180 "1" and "0" in the received sequence 170 on the optical receiver side, respectively.

An effective equalization and compensation algorithm may be used on the optical receiver 150 side, which performs a training process that compares the accurately received content with respective original data (pilot or training sequence known in advance), and mapping relationship is learned accordingly, and then the optical receiver knows how to equalize or compensate any new input distorted data back to its original form. Equalization and compensation algorithms can employ a CDR algorithm, MLSE algorithm, Neural Network (NN) algorithm, or the like.

The optical network 100 shown in FIG. 1 needs to eliminate the inter-symbol interference introduced by the imperfection of the channel. In the optical network 100, the equalization and compensation algorithm is used only on the optical receiver 150 side, so that the optical receiver learns the equalization or compensation strategy and correctly recovers the originally transmitted sequence from the received sequence. In contrast, on the optical transmitter 130 side, only fixed, experience-based preprocessing is used, and the lack of a clear algorithm requires the optical transmitter 130 to evolve or adjust its settings in a specific direction step by step for parameter optimization. This makes it impossible to fully utilize the allowable capacity of the link even with a perfect optical receiver 150 and decoding technology.

Inventors noticed that the lack of preprocessing/encoder on the adaptive optical transmitter 130 side is mainly due to the fact that the end-to-end response is complex and implicit. Real optical channels are non-Gaussian, non-ideal bandwidth-limited systems, making the inter-symbol interference complicated. Moreover, there is an implicit superposition effect between the configuration in the optical transmitter, the channel condition, and the detection method and decoding algorithm in the optical receiver.

Inventors also noticed that in the optical receiver, there are also many decoding methods, which may be original CDR, or a post-equalizer with a few taps, or MLSE-based sequence estimation. In contrast, there is no clear algorithm that requires the optical transmitter to perform a training process to evolve or adjust its settings in a specific direction step by step for parameter optimization. Therefore, there is a need to require the optical transmitter to perform a training process to learn an encoding strategy through a clear indication on the light transmitter side. This optical network can adaptively use the encoding strategy obtained through machine learning on the optical transmitter side to maximize the channel capacity utilization.

Embodiments of the present disclosure propose a solution for a training process of an optical transmitter in an optical network. According to the solution, the optical transmitter can perform a training process to automatically adjust its configuration, so as to maximize the channel capacity. The optical transmitter performs a process to select a PAM value from a set of candidate PAM values based on currently transmitted training data bits, transmitted Pulse Amplitude Modulation (PAM) values corresponding to previously transmitted training data bits, and training data bits to be transmitted subsequently, a training process or a learning process the selected PAM value corresponding to the currently transmitted training data bits; and transmits the selected PAM value to an optical receiver. After receiving, from the optical receiver, an indication as for whether the optical receiver correctly detects the currently transmitted training data bits, the optical transmitter updates the process at least in part based on the indication. Therefore, the optical transmitter can adjust automatically its configuration using the indication from the optical receiver to obtain the encoding strategy through machine learning.

According to embodiments of the present disclosure, the optical transmitter may automatically update the training process step by step based on the indication of the optical receiver, and using neural network learning or a table lookup encoding strategies. Through neural network learning or a table lookup, the output and input of an encoding component of the optical transmitter can be compared to determine the difference between the two, and the encoding component can update the encoding strategy by feeding the difference back to the encoding component. In this way, the channel capacity utilization can be maximized and various conditions of all single optical receivers in an optical network can be adaptively satisfied in an automatic manner.

In some embodiments, the above solution may be implemented in an OTL in a Passive Optical Network (PON). For example, a 50 Gb/s Passive Optical Network (PON) with Non-Return-to-Zero (NRZ) format can be implemented in OLT using only a 20G bandwidth optical transmitter and a 3-bit low-resolution digital-to-analog converter (DAC). At the same time, no hardware update is required in the ONU, and no special decoding or equalization algorithm is required in the ONU. Only some new messages are required to be fed back to the OLT to help the reinforcement learning in the OLT perform intelligent encoding.

In such an optical network, it is implementation by this intelligent automatic encoding before transmission, which allows the optical transmitter to take advantage of the nonlinear channel response and achieve channel capacity. More importantly, traditional low-cost ONUS can be used without manual assistance, as it can all be automated.

Figure 2:
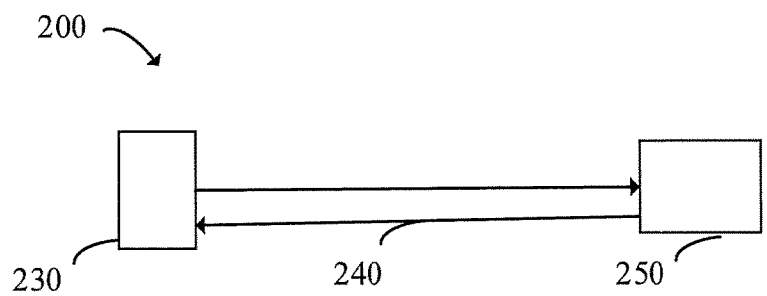
FIG. 2 illustrates an example architecture of an optical network according to the present disclosure.

FIG. 2 illustrates an example architecture of an optical network 200. The optical network 200 includes an optical transmitter 230, a channel 240, and an optical receiver 250. The optical transmitter 230 encodes and modulates a transmitted sequence, making it an encoded sequence suitable for transmission over channel 240, and transmits the encoded sequence to channel 240. The optical transmitter 230 also receives an indication as to whether the optical receiver 250 correctly detects the transmitted sequence from the optical receiver 250, and performs neural network learning or a table lookup to learn and evolve the encoding strategy of the optical transmitter 230, so that it uses the encoding strategy to encode the transmitted sequence in the subsequent transmission.

In the network 200, channel 240 transmits the sequence transmitted by the optical transmitter 230 to the optical receiver 250. Channel 240 has a non-Gaussian, non-linear channel response with inter-symbol interference. Therefore, signals transmitted on channel 240 are subject to inter-symbol interference and transmission errors occur.

In the example shown in FIG. 2, upon receiving the encoded sequence, the optical receiver 250 decodes the received encoded sequence to recover the received sequence. Due to the non-linearity of channel 240, inter-symbol interference is introduced, so some bits in the recovered sequence may have errors. The optical receiver may compare the sequences bit by bit and feed back the optical transmitter 230 with an indication of the correctness of each bit. The optical receiver 250 may also equalize or compensate the recovered error bits back to the original transmitted bits according to the mapping relationship learned by using an effective equalization and compensation algorithm.

Figure 3:
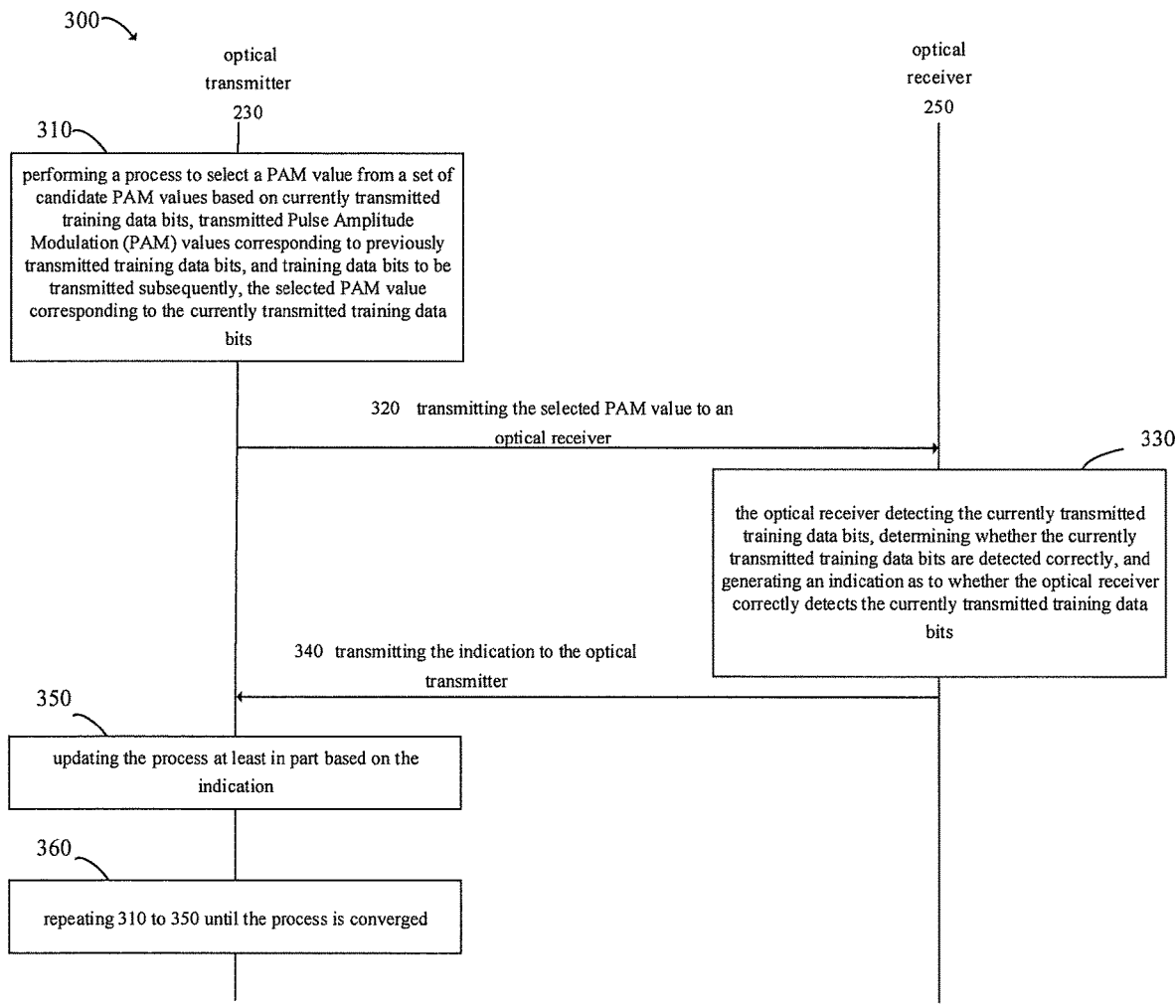
FIG. 3 illustrates an example training process for an optical transmitter according to some embodiments of the present disclosure.

FIG. 3 illustrates an example communication and operation process 300 of an optical transmitter 230 and an optical receiver 250 according to some embodiments of the present disclosure. The optical transmitter 230 may perform (310) a process (e.g. a learning or training process) to select a PAM value from a set of candidate PAM values based on currently transmitted training data bits, one or more transmitted PAM values corresponding to previously transmitted training data bits, and one or more training data bits to be transmitted subsequently, the selected PAM value corresponding to the currently transmitted training data bits, thereby encoding the currently transmitted training data bits into PAM values. Considering that the real channel is non-Gaussian, bandwidth-insufficient, and nonlinear, the output of the training process will not only be determined by the currently transmitted bits, but also the output of the previous steps (the transmitted PAM values corresponding to the previously transmitted bits) and several bits to be transmitted subsequently.

In some embodiments, the process may also be initialized, and initializing the process includes at least one of the following is predefined: the number of the transmitted PAM values corresponding to the previously transmitted training data bits, the number of training data bits to be transmitted subsequently, an order of the PAM, and a value of an indication as to whether the optical receiver correctly detects the currently transmitted training data bits.

In some embodiments, the process may be performed by neural network learning or by a table lookup. Examples of neural network learning or a table lookup include, but are not limited to, Deep Q Network (DQN), a "status-action" Two-Dimensional Table (Q-Table), and the like. An example process of performing a process to select, from a set of candidate PAM values, a PAM value corresponding to the currently transmitted training data bit is now described in detail with reference to FIG. 4.

Figure 4:
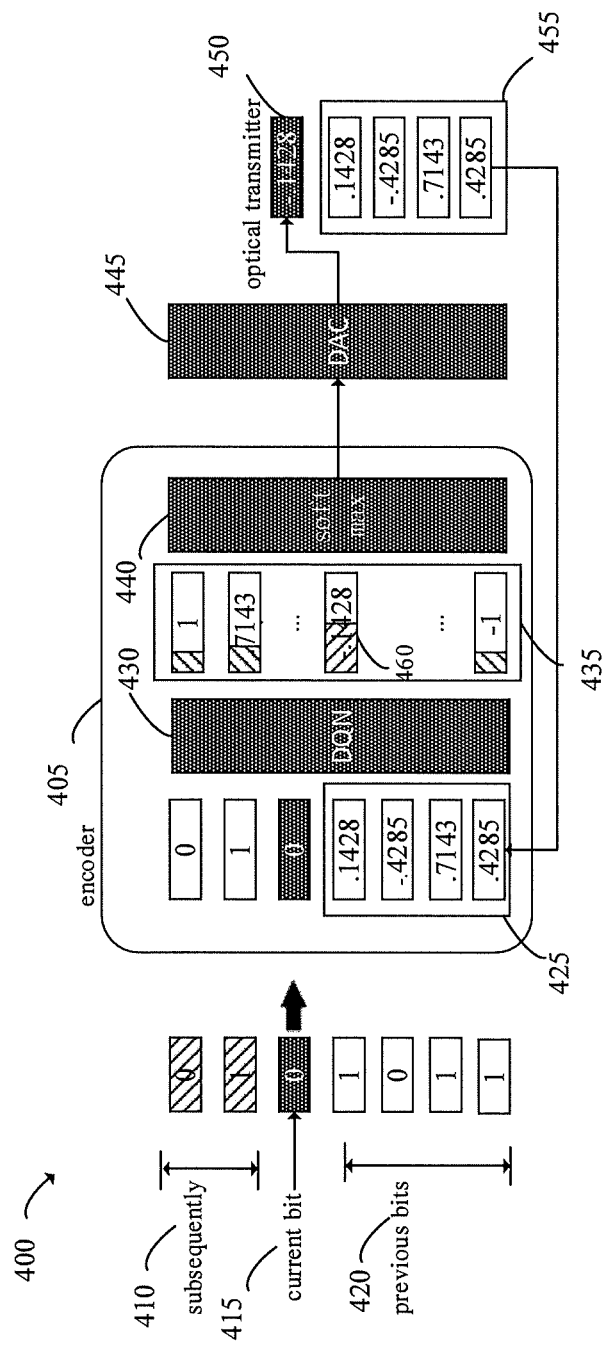
FIG. 4 illustrates selecting a PAM value corresponding to the currently transmitted training data bits according to embodiments of the present disclosure.

FIG. 4 illustrates an example process 400 of selecting a PAM value corresponding to the currently transmitted training data bit according to embodiments of the present disclosure. As an example, an encoder 405 may be introduced in the optical transmitter 230.

In process 400, a training sequence includes two bits of training data bits 410 to be transmitted subsequently, one bit of the currently transmitted training data bits 415, and four bits of PAM values 425 corresponding to previously transmitted training data bits. A 3-bit PAM (i.e., PAM8) is used, and the respective set of candidate PAM values is (1, 0.7143, 0.4286, 0.1428, −0.1428, −0.4286, −0.7143, −1). For example, the training sequence includes two training data bits 410 ("0" and "1") to be transmitted subsequently, one currently transmitted training data bit 415 ("0"), and transmitted PAM values 425 (referred to as "previous status" below, for ease of description) ("0.1428," "−0.4285," "0.7143" and "0.4285") corresponding to four previously transmitted training data bits 420 ("1," "0," "1" and "1"). In this embodiment, the number of the previous statuses 425 and the number of the training data bits 410 to be transmitted subsequently may be flexibly selected according to needs. This training sequence is used as an input of the encoder 405, and the encoder performs, based on the input, a process to select 440, from a set of candidate PAM values, a PAM value corresponding to the currently transmitted training data bits 415.

In some embodiments, the number and value of the candidate PAM values are related to the order of the selected PAM. In order to simplify the process and save costs, in some embodiments, a 3-bit PAM (i.e., PAM8) is selected.

In some embodiments, by performing the process, a probability of a candidate PAM value of the set of candidate PAM values being selected can be determined; and based on the determined probability, the PAM value corresponding to the currently transmitted training data bits may be selected. In some embodiments, a set of candidate PAM values may be determined based on the order of the selected PAM. Taking DQN and PAM8 as an example, a set of candidate PAM values associated with PAM8 is (1, 0.7143, 0.4286, 0.1428, −0.1428, −0.4286, −0.7143, DQN outputs eight options 435 based on the input, each of which corresponds to a value in the set of candidate PAM values of the 3-bit PAM8, which indicates a probability (e.g., a probability indication) of the PAM value is selected as the PAM value corresponding to the currently transmitted training data bits. For example, DQN outputs 435 {1, 0.7143, 0.4286, 0.1428, −0.1428, −0.4286, −0.7143, −1}, and each value is assigned a different probability indication 460 for indicating a probability of being selected as the PAM value corresponding to the currently transmitted training data bit. The PAM value with the maximum probability indication is selected (440) from the 8 probability indications output by DQN above. As shown in FIG. 4, −0.1428 is the maximum probability indication, indicating that, for the currently transmitted training data bit, the DQN intends to encode it into −0.1428 currently.

In some embodiments, transmitting the selected PAM value to the optical receiver 250 includes: performing digital-to-analog converting on the selected PAM value; and transmitting the converted selected PAM value to the optical receiver 250. Specifically, the PAM value −0.1428 may be transmitted to a digital to analog converter (DAC) 445, which is converted into an analog signal and a drive voltage of −0.1428 is output to the optical transmitter 230.

Continuing to refer to FIG. 3, the optical transmitter 230 transmits (320) the selected PAM value 445 to the optical transceiver 250. The optical receiver 250 detects (330) the currently transmitted training data bits, determines whether the currently transmitted training data bits are correctly detected, and generates an indication as to whether the optical receiver 250 correctly detects the currently transmitted training data bits. In an embodiment, the optical receiver 250 compares the received training data bits with the corresponding originally transmitted training data bits (a training sequence known in advance), so as to determine whether the currently transmitted training data bits are correctly detected, and generates an indication as to whether the optical receiver 250 correctly detects the currently transmitted training data bits. The indication may be generated in any appropriate manner. As an example, the correctly detected training data bit may be assigned a different value from the error detected training data bit. For example, a greater value "+0.1" is assigned to the correctly detected training data bit, while a smaller value "−0.9" is assigned to the error detected training data bit. Then, the optical receiver 250 transmits (340) the indication to the optical transmitter 230.

At block 350, the optical transmitter 230 updates the process at least in part based on the indication. The updated process is compared with a convergence condition; in response to the updated process not satisfying the convergence condition, 310 to 350 in the process 300 are repeated until the convergence condition is satisfied. For example, the optical transmitter 230 repeats performing 310 to 350 (360) until the process is converged.

Still take DQN as an example, there are two networks in DQN that have exactly the same structure but different initialization parameters. The network MainNet (referred to as the first network below, for ease of description) that predicts the estimation of Q uses the latest parameters, while the neural network TargetNet (referred to as second network below, for ease of description) that predicts the reality of Q uses the parameters of a long time ago. Q1 (s,a;θi) represents an output of the current first network, which is used to evaluate a value function of the current status-action pair; Q2 (s,a;θi) represents an output of the second network, which can be solved for targetQ. Therefore, when an action is taken on the environment, the Q can be calculated based on Q1 (s,a;θi) and Q2 (s,a;θr), and the parameters of the first network can be updated based on a cost function. After a certain number of iterations, the parameters of the first network are replicated to the second network. As such, a learning process is calculated, so that the calculated Q is closer to targetQ.

Specifically, in this embodiment, the update speed of the first network is different from that of the second network. The first network is updated quickly, and the parameters of the first network are replicated to the second network every certain number of iterations. In each iterative calculation of the first network, for the input values, that is, the currently transmitted training data bits (for example, 415 in FIG. 4), the transmitted PAM values (for example, 425 in FIG. 4) corresponding to the previously transmitted training data bits, and the training data bits to be transmitted subsequently (for example, 410 in FIG. 4), calculate the probability (for example, the probability indication 460 in FIG. 4) that each PAM value becomes the PAM value into which the current DQN desires to encode the currently transmitted bits. The maximum probability indication 460 is selected in the output, and after the maximum probability indication is multiplied by a delay effect parameter, a temporary result is obtained by adding the multiplication product to the indication received from the optical receiver. For the same input values, the second network calculates a probability (for example, the probability indication 460 in FIG. 4) that each PAM value becomes the PAM value into which the current DQN desires to encode the currently transmitted training data bits, and finds the position where the maximum probability indication is located. The temporary result calculated by the first network is used as the probability indication of the PAM value at the position where the maximum probability indication found in the second network is located, and the modified output value in the second network is assigned to the output value of the first network. Then, neural network learning is performed on the first network until the first network satisfies a convergence rule. At this point, the first network iterative learning process is completed and the above process is repeated. Until the parameters coverage of the first network to the second network is terminated, the termination rule is the same as the convergence rule. In some specific embodiments, the convergence rule can use any of the following: 1. a number of parameter coverage of the first network to the second network reaches a set upper limit; 2, the entropy or damage function value is less than or equal to a threshold; 3. the gradient value is less than or equal to a threshold; and 4. a number of iterations of the first network reaches a set upper limit.

The optical receiver 250 feeds back to the optical transmitter 230 an indication as to whether the currently transmitted training data bits are detected correctly, the optical transmitter 230 may perform, based on the indication, neural network learning or a table lookup, so that the encoder in the optical transmitter 230 can automatically learn the encoding strategy. By performing the encoding strategy prior to transmission, the channel capacity utilization can be automatically maximized, and at the same time, it can be compatible with any existing detection and decoding methods on the optical receiver side, without the need to update the optical receiver hardware and the equalization algorithm.

Figure 5:
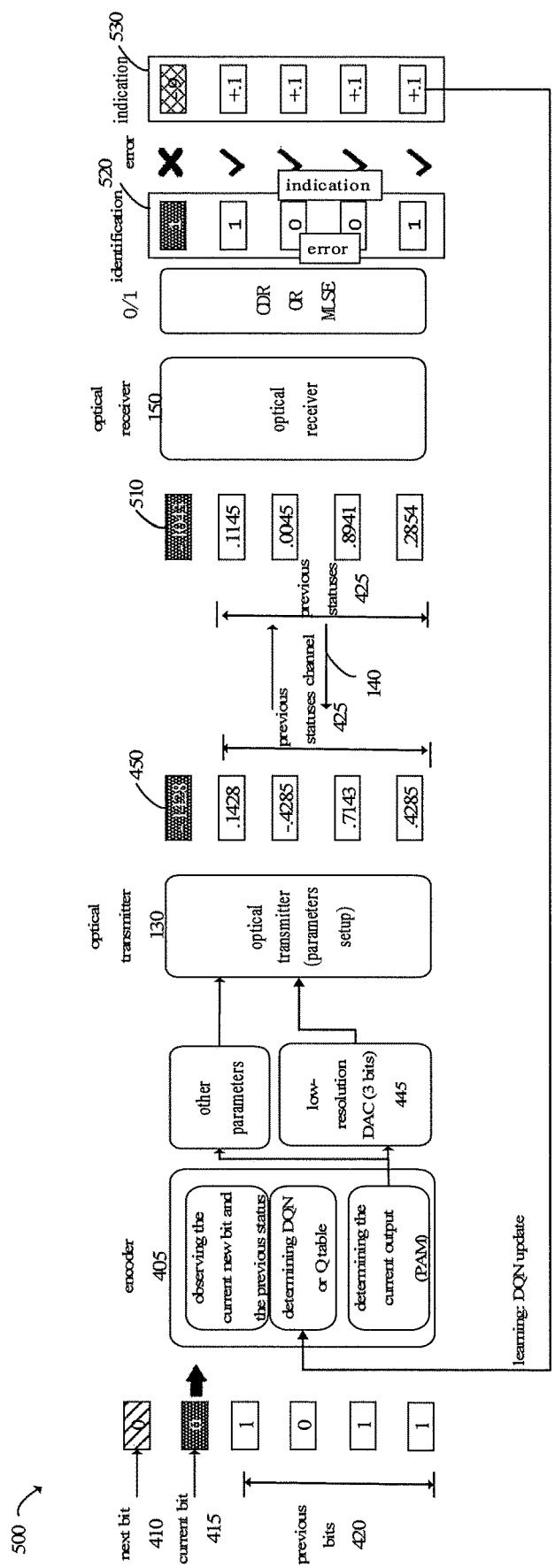
FIG. 5 illustrates a block diagram according to a specific embodiment of the present disclosure.

FIG. 5 illustrates a block diagram according to a specific embodiment of the present disclosure.

In FIG. 500, in the encoder 405, the following are performed including: reviewing a training data bit 410 "0" to be transmitted subsequently, a currently transmitted training data bit 415 "0", and previous statuses 425 corresponding to four previously transmitted training data bits 420 "1," "0," "1" and "1"; determining, based on DQN or Q-Table, a PAM value 450 corresponding to the currently transmitted training data bit; transmitting it to the DAC 445; and after converting it into an analog signal, a drive voltage of the PAM value 450 is output. The PAM value 450 is transmitted to the optical receiver via channel 240.

Due to the inter-symbol interference in channel 240, the transmitted PAM value 450 (−0.1428) becomes a wrong PAM value 510 (−1.043). Upon receiving the wrong PAM value, the optical receiver 250 performs decoding recovery using CDR or MLSE to recover it to a 0/1 bit 520 ("1"). Since the optical receiver 250 knows the originally transmitted training sequence of the optical transmitter 230, the optical receiver 250 may compare the currently detected bit 520 ("1") with the originally transmitted ("0") of the optical transmitter 230. Thus, it is found that an error occurs in the currently detected bit 520, and an indication 530 is generated, indicating that the bit has an error, and it is assigned a value of −0.9.

The optical receiver 250 feeds back the indication 530 to DQN or Q-table in the encoder 405 for neural network learning or a table lookup.

The above process is repeated until the convergence condition of the neural network is satisfied.

Figure 6:
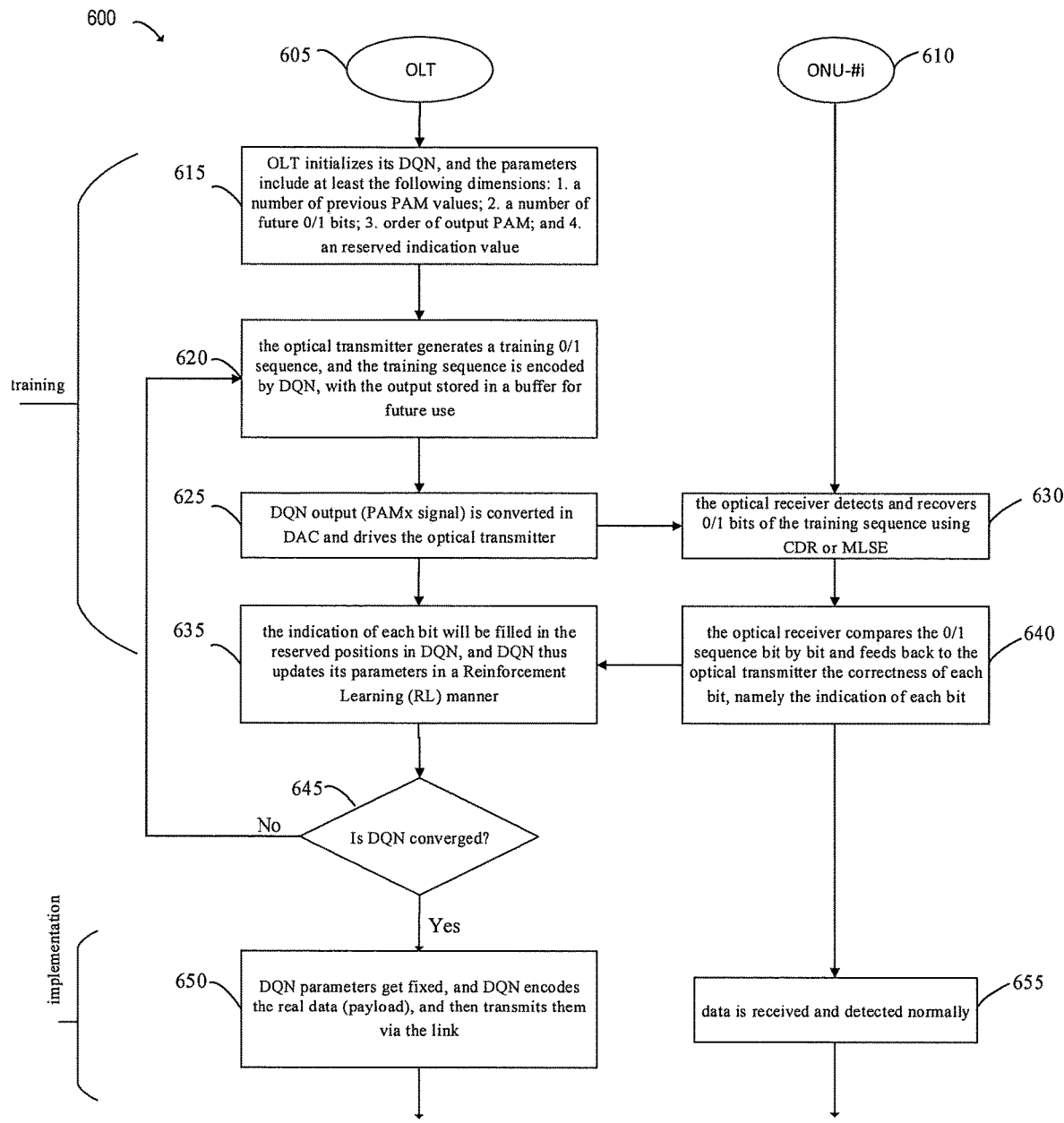
FIG. 6 illustrates a flowchart according to a specific embodiment of the present disclosure.

FIG. 6 illustrates a flowchart according to a specific embodiment of the present disclosure. The process 600 includes a training process and an implementation process. For example, the optical transmitter is OLT 605, and the optical receiver is ONU 610.

In the training process, at block 615, OLT initializes parameters of its DQN, and the parameters include at least the following dimensions: 1. a number of previous PAM values; 2. a number of future 0/1 bits; 3. order of the output PAM; and 4. a reserved indication value. At block 620, the optical transmitter generates a training 0/1 sequence. The sequence is encoded by DQN, and its output is stored in a buffer for future use. At block 625, the DQN output (a PAMX signal) is converted in the DAC, and drives OLT to transmit the output to ONU. At 630, ONU detects and recovers the 0/1 bit of the training sequence using an equalization algorithm such as CDR or MLSE, or the like. At 640, the optical receiver 610 compares the 0/1 sequence bit by bit and feeds back to the optical transmitter 605 the correctness of each bit, namely the indication of each bit. At block 635, the indication of each bit will be filled in the reserved positions in DQN, and DQN thus updates its parameters in a Reinforcement Learning (RL) manner. At block 645, it is determined whether DQN satisfies the convergence condition. If yes, the training process is ended; otherwise, blocks 615 to 645 are repeatedly performed until the convergence condition is satisfied.

In the implementation process, at block 650, DQN parameters are fixed, and DQN can encode actual data (i.e., payload), and then transmits the encoded data to ONU through the channel. At block 655, ONU may receive and detect data normally using an equalization algorithm.

By performing reinforcement learning on the optical transmitter 230, the optical transmitter can learn automatically the encoding strategy adapted to the entire end-to-end optical link. The optical receiver 250 does not need any change in hardware, and can use the original decoding algorithm, which only needs to pass some message, for example, feeding back the error information of each training sequence bit. In this way, the allowable channel capacity can be maximized.

Figure 7:
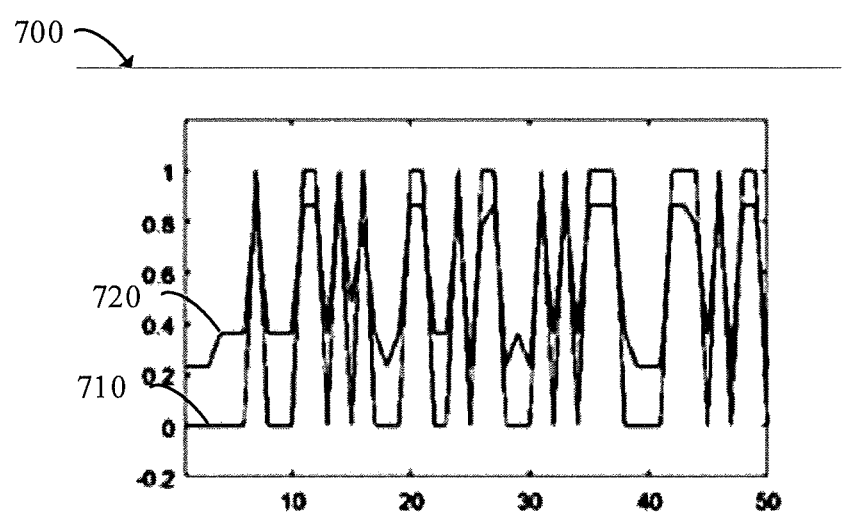
FIG. 7 illustrates an example diagram of a comparison of an originally transmitted sequence and PAM8 values output by a non-linear optical transmitter according to some specific embodiments of the present disclosure.
Figure 8:
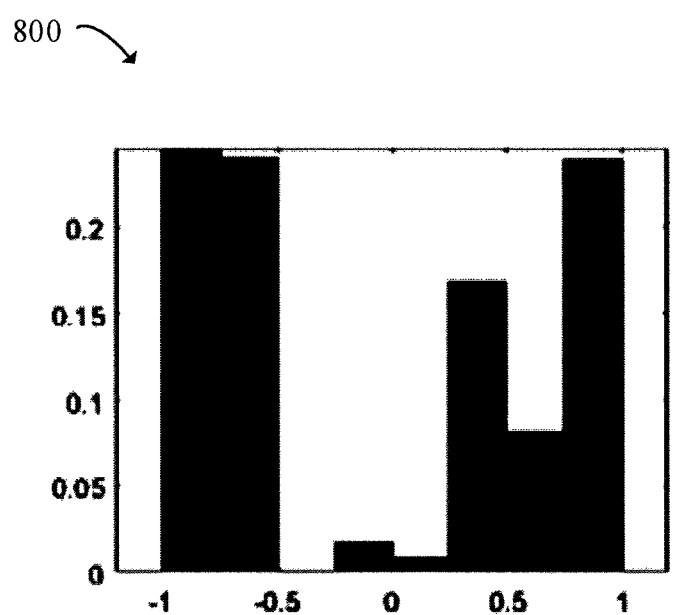
FIG. 8 illustrates an example diagram of a Probability Distribution Function (PDF) output of PAM8 after a Deep Q Learning Network (DQN) according to some specific embodiments of the present disclosure.
Figure 9:
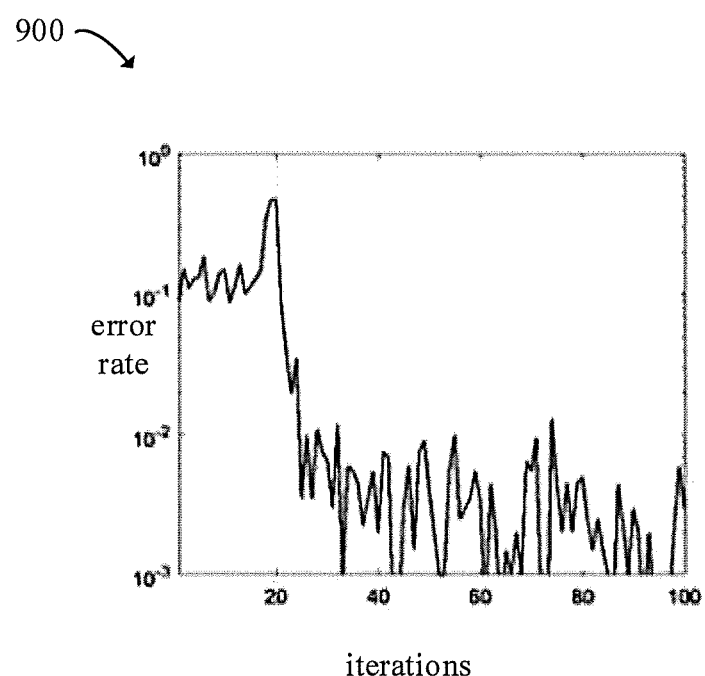
FIG. 9 illustrates a schematic diagram of bit error rate decreasing with the iteration of DQN according to some specific embodiments of the present disclosure.

Take an experiment using a passive PON with insufficient bandwidth as an example. As DQN gradually learns and evolves, it will output PAM8 signals very intelligently. FIG. 7 illustrates an example diagram of a comparison of an originally transmitted sequence and a PAM8 value output by a nonlinear optical transmitter according to some specific embodiments of the present disclosure, where 710 indicates the originally transmitted sequence, and 720 indicates the PAM8 value output by the nonlinear optical transmitter. FIG. 8 illustrates an example diagram of a Probability Distribution Function (PDF) of a PAM8 after a Deep Q Learning Network (DQN) according to some specific embodiments of the present disclosure. It can be seen that after neural network learning or a table lookup, the optical transmitter outputs a PAM8 value that does not conform to the originally transmitted sequence. FIG. 9 illustrates a schematic diagram of bit error rate decreasing with the iterations of DQN according to some specific embodiments of the present disclosure. Using the encoding strategy obtained through neural network learning or a table lookup in FIG. 6 may bring significant advantages in bit error rate, because the encoding strategy can encode the original 0/1 sequence into a waveform adapted to channel transmission and thus maximize the allowable channel capacity.

Figure 10:
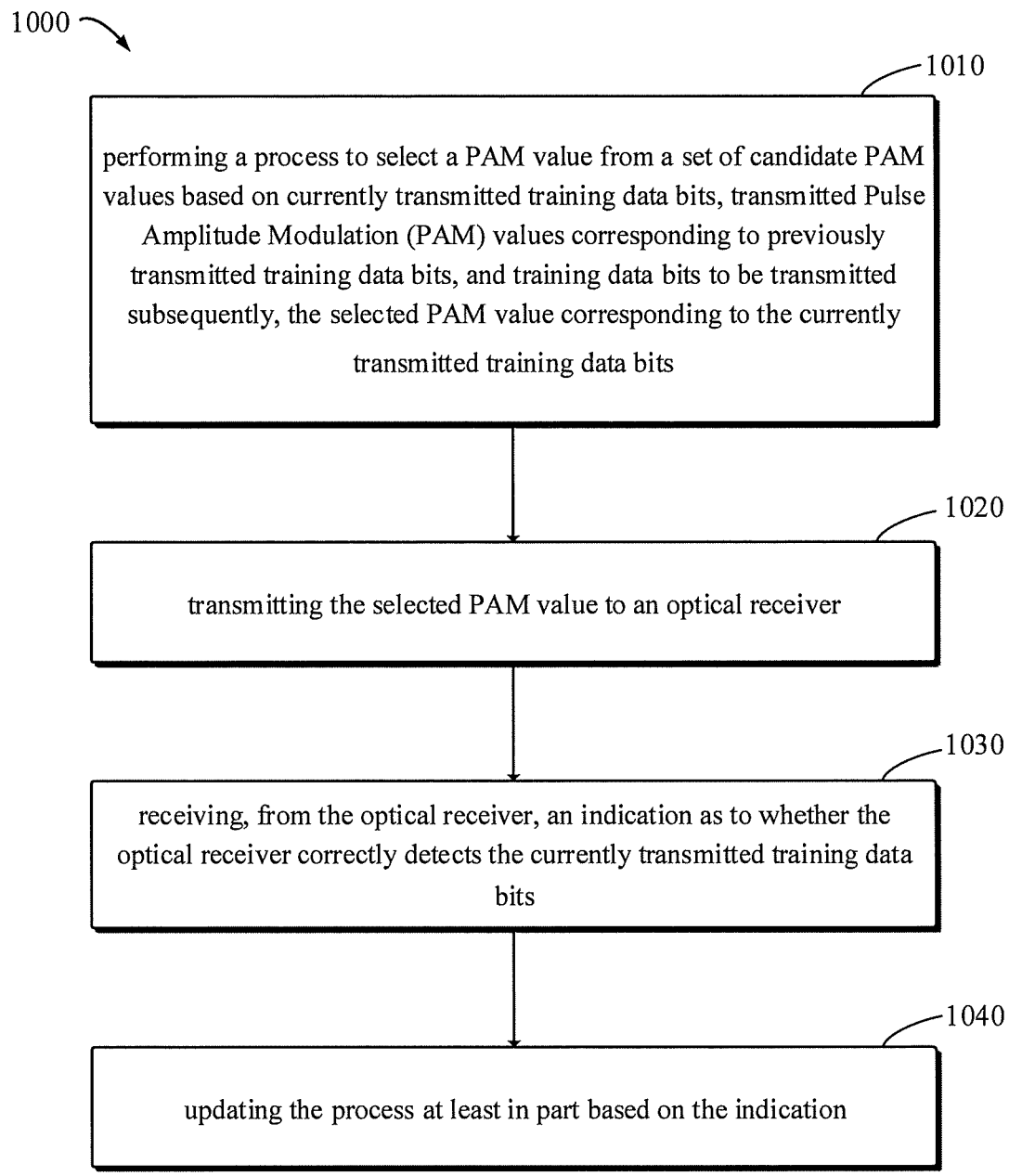
FIG. 10 illustrates a flowchart of a method according to some embodiments of the present disclosure.

FIG. 10 illustrates a flowchart of an example method 1000 according to some embodiments of the present disclosure. The method 1000 may be implemented at the optical transmitter 230 as shown in FIG. 2. For ease of discussion, the method 1000 is described in detail below with reference to FIG. 2.

As shown, at block 1010, the optical transmitter 230 performs a process to select a PAM value from a set of candidate PAM values based on currently transmitted training data bits, transmitted Pulse Amplitude Modulation (PAM) values corresponding to previously transmitted training data bits, and training data bits to be transmitted subsequently, the selected PAM value corresponding to the currently transmitted training data bits. At block 1020, the selected PAM value is transmitted to the optical receiver 250. At block 1030, an indication is received as to whether the optical receiver correctly detects the currently transmitted training data bits. At block 1040, the process is updated at least in part based on the indication.

In some embodiments, the process is performed by neural network learning or by a table lookup.

In some embodiments, at least one of the following is predefined: the number of the transmitted PAM values corresponding to the previously transmitted training data bits, the number of the training data bits to be transmitted subsequently, an order of the PAM, or a value of the indication as to whether the optical receiver correctly detects the currently transmitted training data bits.

In some embodiments, transmitting the selected PAM value to the optical receiver comprises: performing digital-to-analog conversion on the selected PAM value; and transmitting the converted selected PAM value to the optical receiver.

In some embodiments, performing the process comprises: performing the process to determine a probability that a candidate PAM value is selected from the set of candidate PAM values; and selecting, based on the determined probability, the PAM value corresponding to the currently transmitted training data bits.

In some embodiments, the PAM value is a 3-bit PAM8.

It should be appreciated that the operations and features performed by the optical transmitter 230 described above with reference to FIGS. 2-9 are also applicable to the method 1000 and have the same effect, and specific details thus are not described again.

In some embodiments, a device capable of performing the method 1000 (for example, the optical transmitter 230 shown in FIG. 2) may include respective means for performing various steps of the method 1000. These means can be implemented in any appropriate manner. For example, they may be implemented by circuits or software modules.

In some embodiments, the apparatus comprises: means for performing a process to select a PAM value from a set of candidate PAM values based on currently transmitted training data bits, transmitted Pulse Amplitude Modulation (PAM) values corresponding to previously transmitted training data bits, and training data bits to be transmitted subsequently, the selected PAM value corresponding to the currently transmitted training data bits; means for transmitting the selected PAM value to an optical receiver; means for receiving, from the optical receiver, an indication as to whether the optical receiver correctly detects the currently transmitted training data bits; and means for updating the process at least in part based on the indication.

In some embodiments, the process is performed by neural network learning or by a table lookup.

In some embodiments, at least one of the following is predefined: the number of the transmitted PAM values corresponding to the previously transmitted training data bits, the number of the training data bits to be transmitted subsequently, an order of the PAM, or a value of the indication as to whether the optical receiver correctly detects the currently transmitted training data bits.

In some embodiments, means for transmitting the selected PAM value to the optical receiver comprises: means for performing digital-to-analog conversion on the selected PAM value; and means for transmitting the converted selected PAM value to the optical receiver.

In some embodiments, means for performing the process comprises: means for performing the process to determine a probability that a candidate PAM value is selected from the set of candidate PAM values; and means for selecting, based on the determined probability, the PAM value corresponding to the currently transmitted training data bits.

In some embodiments, the PAM value is a 3-bit PAM8.

Figure 11:
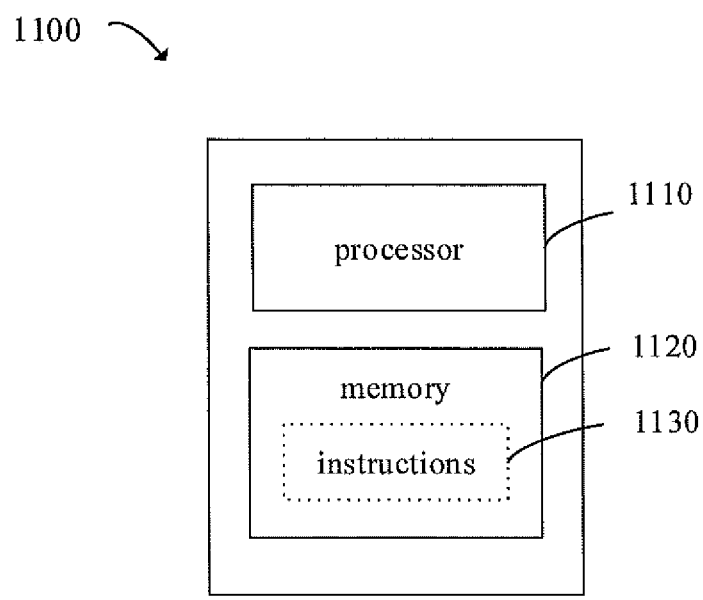
FIG. 11 illustrates a block diagram of a device adapted to implement embodiments of the present disclosure.

FIG. 11 illustrates a block diagram of a device 1100 adapted to implement embodiments of the present disclosure. The device 1100 may be implemented at the optical transmitter 230 or a part of the optical transmitter 230 shown in FIG. 2.

As shown in FIG. 11, the device 1100 includes a processor 1110. The processor 1110 controls operations and functionalities of the device 1100. For example, in some embodiments, the processor 1100 may perform various operations by means of instructions 1130 stored in a memory 1120 coupled thereto. The memory 1120 may be of any appropriate type adapted to the local technical environment, and may be implemented using any appropriate data storage technology, including, but not limited to, a semiconductor-based storage device, a magnetic storage device and system, and an optical storage device and system. Although FIG. 11 shows only one memory unit, there may be a plurality of physically different memory units in the device 1100.

The processor 1110 may be of any appropriate type adapted to the local technical environment, and may include, but is not limited to, one or more of a general-purpose computer, a special-purpose computer, a microcontroller, a Digital Signal Controller (DSP), and a controller-based multi-core controller model. The device 1100 may also include a plurality of processors 1110. The device 1100 may include a communication module (not shown), which may implement information received and transmitted in a wired manner, such as an optical fiber, cable or the like, or a wireless manner.

The processor 1110 performs instructions, causing the device 1100 to perform related operations and features of the optical transmitter 230 described above with reference to FIGS. 2-10. All the features described above with reference to FIGS. 2-10 are applicable to the device 1100, and details are not described herein again.

In general, various example embodiments of the present disclosure can be implemented in hardware or special purpose circuits, software, logic, or any combination thereof. Some aspects can be implemented in hardware, while other aspects can be implemented in firmware or software that can be executed by a controller, microprocessor, or other computing devices. When each aspect of the embodiments of the present disclosure is illustrated or depicted as a block diagram, flowchart, or using some other graphical representations, it would be appreciated that the blocks, devices, systems, techniques, or methods described herein can be implemented as a non-limiting example in hardware, software, firmware, dedicated circuits or logic, general hardware or controllers or other computing devices, or some combinations thereof.

As an example, the embodiments of the present disclosure can be described in the context of machine-executable instructions which are included, for example, in a program module executed in a device on a target physical or virtual processor. Generally speaking, program modules include routines, programs, libraries, objects, classes, components, data structures and the like, which perform particular tasks or implement particular abstract data structures. In various embodiments, the functions of the program modules can be combined or divided between the program modules described herein. Machine-executable instructions for program modules can be executed locally or within a distributed device. In a distributed device, the program module may be located in both of a local and a remote storage medium.

Computer program code for implementing methods of the present disclosure may be written in one or more programming languages. These computer program codes may be provided to a processor of a general-purpose computer, special-purpose computer, or other programmable data processing apparatus, so that the program codes, when executed by the computer or other programmable data processing devices, cause the functions/operations specified in the flowcharts and/or block diagrams to be implemented. The program code may be executed entirely on a computer, partly on the computer, as a stand-alone software package, partly on a computer and partly on a remote computer or entirely on a remote computer or server.

In the context of this disclosure, computer program codes or related data may be carried by any appropriate carrier to enable a device, apparatus, or a processor to perform various processes and operations described above. Examples of the carrier include signals, computer readable media, and the like.

Examples of signals may include electrical, optical, radio, sound, or other forms of propagation, such as carrier waves, infrared signals, and the like.

A computer readable medium may be any tangible medium that may contain or store a program for or in connection with an instruction execution system, apparatus, or device. The computer readable medium may be a computer readable signal medium or a computer readable storage medium. A computer readable medium may include, but is not limited to, an electronic, magnetic, optical, electromagnetic, infrared, or semiconductor system, apparatus or device, or any suitable combination thereof. More detailed examples of computer readable storage medium include an electrical connection with one or more wires, a portable computer disk, a hard disk, a random access memory (RAM), a read-only memory (ROM), an erasable programmable read-only memory (EPROM or Flash memory), an optical storage device, a magnetic storage device, or any suitable combination thereof.

Further, although operations are depicted in a particular order, this should not be construed as requiring that such operations be performed in the particular order shown or in sequential order, or that all illustrated operations be performed to achieve a desirable result. In some cases, multitasking or parallel processing can be beneficial. Likewise, although the above discussions include certain specific implementation details, these should not be construed as limiting the scope of any invention or claim, but rather as descriptions of features that may be specific to particular embodiments of a particular invention. Certain features that are described in this specification in the context of separate embodiments may also be implemented in combination in a single embodiment. Conversely, various features that are described in the context of a single embodiment may also be implemented separately in multiple embodiments or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. An optical transmitter, comprising:
   at least one processor;
   a non-transitory memory coupled to the at least one processor and having instructions stored therein, the instructions, when executed by the at least one processor, being configured to perform acts comprising:
   performing a process to select a pulse amplitude modulation value, the selection determined by a set of candidate pulse amplitude modulation values based on currently transmitted training data bits, transmitted pulse amplitude modulation values corresponding to previously transmitted training data bits, and training data bits to be transmitted subsequently;
   encoding the currently transmitted training data bits into the selected pulse amplitude modulation value;
   transmitting the selected pulse amplitude modulation value to an optical receiver;
   receiving, from the optical receiver, an indication as to whether the optical receiver correctly detects the currently transmitted training data bits; and
   updating the process at least in part based on the indication towards a convergence condition.

2. The optical transmitter of claim 1, wherein the process is performed by neural network learning.

3. The optical transmitter of claim 1, wherein at least one of the following is predefined:
   the number of the transmitted pulse amplitude modulation values corresponding to the previously transmitted training data bits,
   the number of the training data bits to be transmitted subsequently,
   an order of the pulse amplitude modulation, or
   a value of the indication as to whether the optical receiver correctly detects the currently transmitted training data bits.

4. The optical transmitter of claim 1, wherein transmitting the selected pulse amplitude modulation value to the optical receiver comprises:
   performing digital-to-analog conversion on the selected pulse amplitude modulation value; and
   transmitting the converted selected pulse amplitude modulation value to the optical receiver.

5. The optical transmitter of claim 1, wherein performing the process comprises:
   performing the process to determine a probability that a candidate pulse amplitude modulation value is selected from the set of candidate pulse amplitude modulation values; and selecting, based on the determined probability, the pulse amplitude modulation value to be the currently transmitted training data bits.

6. The optical transmitter of claim 1, wherein the pulse amplitude modulation value is a 3-bit PAM8.

7. The optical transmitter of claim 1, wherein the process is performed by a table lookup.

8. The optical transmitter of claim 1, wherein the convergence condition is at least one of: a number of parameter coverage of the process of the optical transmitter reaching a set upper limit; an entropy or damage function value associated with the process being less than or equal to a threshold; a gradient value associated with the process being less than or equal to a threshold; or a number of iterations of the process reaching a set upper limit.

9. A method performed at an optical transmitter, comprising:
    performing a process to select a pulse amplitude modulation value, the selection determined by a set of candidate pulse amplitude modulation values based on currently transmitted training data bits, transmitted pulse amplitude modulation values corresponding to previously transmitted training data bits, and training data bits to be transmitted subsequently;
    encoding the currently transmitted training data bits into the selected pulse amplitude modulation value;
    transmitting the selected pulse amplitude modulation value to an optical receiver;
    receiving, from the optical receiver, an indication as to whether the optical receiver correctly detects the currently transmitted training data bits; and
    updating the process at least in part based on the indication towards a convergence condition.

10. The method of claim 9, wherein the process is performed by neural network learning or by a table lookup.

11. The method of claim 9, wherein at least one of the following is predefined:
    the number of the transmitted pulse amplitude modulation values corresponding to the previously transmitted training data bits,
    the number of the training data bits to be transmitted subsequently,
    an order of the pulse amplitude modulation, or
    a value of the indication as to whether the optical receiver correctly detects the currently transmitted training data bits.

12. The method of claim 9, wherein transmitting the selected pulse amplitude modulation value to the optical receiver comprises:
    performing digital-to-analog conversion on the selected pulse amplitude modulation value; and
    transmitting the converted selected pulse amplitude modulation value after the conversion to the optical receiver.

13. An optical transmitter, comprising:
    means for performing a process to select a pulse amplitude modulation value from a set of candidate pulse amplitude modulation values based on currently transmitted training data bits, transmitted pulse amplitude modulation values corresponding to previously transmitted training data bits, and training data bits to be transmitted subsequently, the selected pulse amplitude modulation value corresponding to the currently transmitted training data bits;
    means for transmitting the selected pulse amplitude modulation value to an optical receiver;
    means for receiving, from the optical receiver, an indication as to whether the optical receiver correctly detects the currently transmitted training data bits; and
    means for updating the process at least in part based on the indication.

14. A non-transitory computer readable storage medium having computer program instructions stored thereon, the instructions, when executed by a processor on an optical transmitter, causing the optical transmitter to perform acts comprising:
    performing a process to select a pulse amplitude modulation value, the selection determined by a set of candidate pulse amplitude modulation values based on currently transmitted training data bits, transmitted pulse amplitude modulation values corresponding to previously transmitted training data bits, and training data bits to be transmitted subsequently;
    encoding the currently transmitted training data bits into the selected pulse amplitude modulation value;
    transmitting the selected pulse amplitude modulation value to an optical receiver;
    receiving, from the optical receiver, an indication as to whether the optical receiver correctly detects the currently transmitted training data bits; and
    updating the process at least in part based on the indication towards a convergence condition.

15. The computer readable storage medium of claim 14, wherein the process is performed by neural network learning or by a table lookup.

16. The computer readable storage medium of claim 14, wherein at least one of the following is predefined:
    the number of the transmitted pulse amplitude modulation values corresponding to the previously transmitted training data bits,
    the number of the training data bits to be transmitted subsequently,
    an order of the pulse amplitude modulation, or
    a value of the indication as to whether the optical receiver correctly detects the currently transmitted training data bits.

17. The computer readable storage medium of claim 14, wherein transmitting the selected pulse amplitude modulation value to the optical receiver comprises:
    performing digital-to-analog conversion on the selected pulse amplitude modulation value; and
    transmitting the converted selected pulse amplitude modulation value after the conversion to the optical receiver.

* * * * *